June 3, 1952 — R. M. M. OBERMAN — 2,599,344

TELEGRAPH EXCHANGE FOR LINES WITH SIMPLEX OR DUPLEX CHARACTERISTICS

Filed Oct. 1, 1947 — 2 SHEETS--SHEET 1

ROELOF MAARTEN MARIE OBERMAN
INVENTOR

BY [signature]

June 3, 1952 R. M. M. OBERMAN 2,599,344

TELEGRAPH EXCHANGE FOR LINES WITH SIMPLEX OR DUPLEX CHARACTERISTICS

Filed Oct. 1, 1947 2 SHEETS--SHEET 2

INVENTOR
ROELOF MAARTEN MARIE OBERMAN
BY

Patented June 3, 1952 2,599,344

UNITED STATES PATENT OFFICE 2,599,344

TELEGRAPH EXCHANGE FOR LINES WITH SIMPLEX OR DUPLEX CHARACTERISTICS

Roelof M. M. Oberman, The Hague, Netherlands

Application October 1, 1947, Serial No. 777,139
In the Netherlands July 26, 1941

Section 1, Public Law 690, August 8, 1946
Patent expires July 26, 1961

10 Claims. (Cl. 178—2)

The present invention relates to telegraph systems, and more particularly, to telegraph systems comprising an exchange to which a plurality of subscribers in connected.

Heretofore systems have been described in which subscriber lines each terminate in a repeater in the exchange so as to obtain a system in which a number of connecting lines may be interconnected in simple manner without danger of signal distortion or of a reduction of operating speed.

Also systems are known in which each subscriber line is terminated in the exchange by a repeater.

In U. S. Patent Specification 1,959,412 a bidirectional telegraph system worked on subscriber lines of identical nature has been described in which a repeater is added in the connecting circuit between lines.

The telegraph system according to the invention comprises a number of subscribers connected to the several exchanges by lines which may be simplex or duplex, these lines being provided as required in the exchange with a repeater the circuit of which adapts itself automatically to the number nature of the incoming or outgoing connecting lines in a manner not resulting in signal distortion or limitation in speed of operation.

Several advantages over the known telegraph systems are obtained by the present invention, such as the fact that the line of the subscriber does not terminate in the exchange in an invariable repeater but in a repeater circuit which adapts itself to the simplex and duplex lines so that a great economy is obtained.

The adaptation of the single current subscriber line to the repeater may be obtained by artificially prolonging these lines by means of suitable networks to a standard length. The circuit may also be arranged thus that the network required at the incoming end of the single current subscriber to provide for the adaptation of the repeaters common to the subscriber lines is maintained as an individual unit so that a constant desired adaptation of the line to the repeater is effected.

The repeaters in the system of the invention are so arranged that their circuit adapts itself automatically to the number nature of the incoming and of the outgoing lines, the adaptation of the repeater to the line being unvaryingly the same as required.

The incoming subscriber line may be suitable at the subscribers desire for simplex or duplex single current traffic double current lines being for instance provided for district subscribers, these being either fitted with fixed line terminations or not.

The outgoing connections may be of the same nature as mentioned, such that incoming and outgoing connections of different nature may be interconnected as required. The repeater is not only suitable to the interconnection of subscriber lines of a single exchange but also the adaptation of arbitrary connections to and from other exchanges.

Modifying the fixed terminating apparatus which was used hitherto in automatic telegraphic exchanges so that the apparatus inserted when necessary in the connecting link renders possible the introduction of automatic tests not disturbing the subscribers.

The invention is described with reference to an example for an automatic register exchange. The system of the invention may however also be applied to manual exchanges or to direct system exchanges or to other types of semi or full automatic exchanges.

The drawings show the system of the invention only in so far as it is necessary for a proper understanding of the same.

Figure 1:
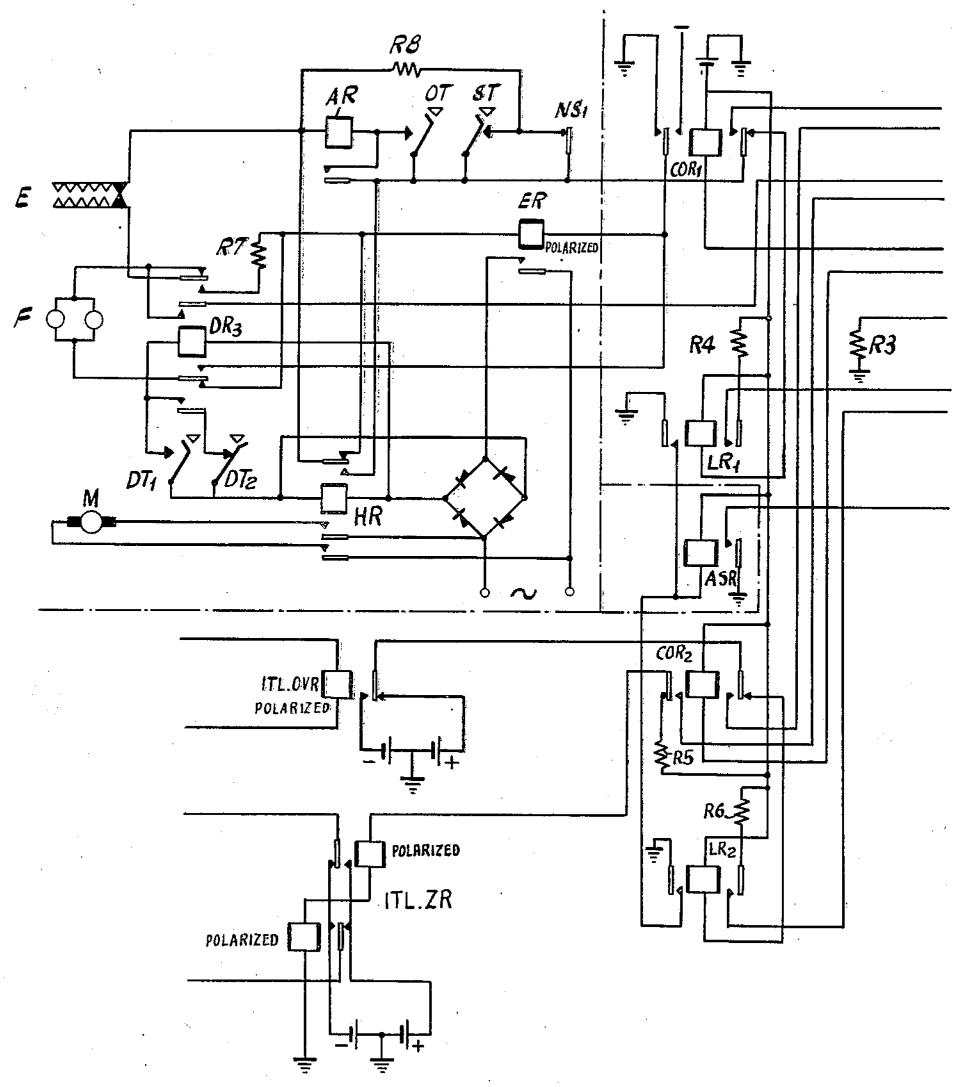
Fig. 1 shows the circuit of a local subscriber and the terminating circuit of a district subscriber.

In the upper part of Fig. 1 the circuit of a local subscriber set is shown which is provided with the arrangement according to the invention for working simplex and duplex. This subscriber is connected to the exchange by two pairs of wires. In the lower part of Fig. 1 the repeater is shown having a double current line, which may be the connection to the exchange of a district subscriber or of another exchange. Furthermore, an apparatus is shown individual to the subscribers, and serving to terminate the lines, which apparatus consists of the line and cut-off relays and, for the single current lines, of the compensating resistance adapting the telegraph relays in the adaptable repeater to these lines.

Figure 2:
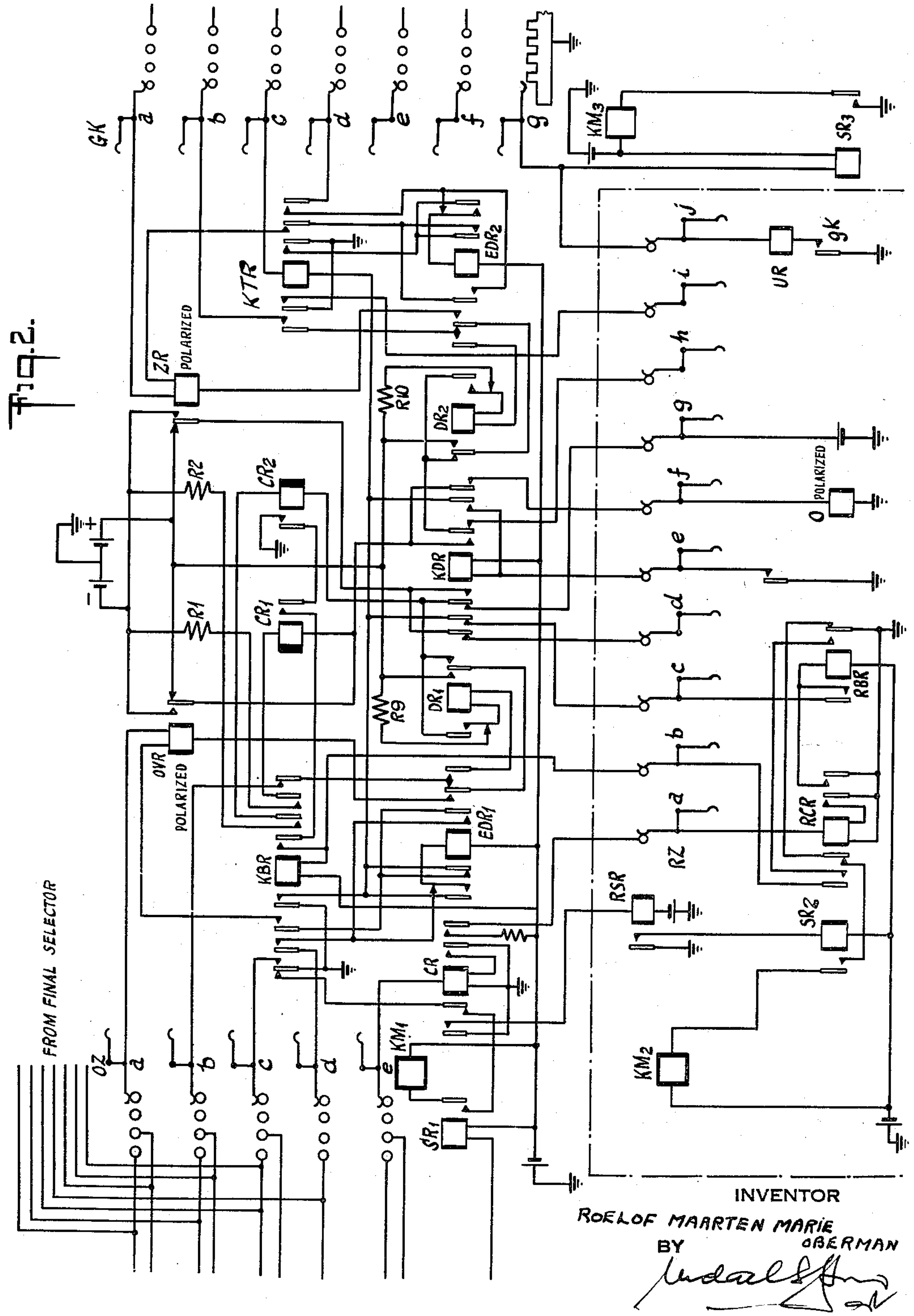
Fig. 2 shows the main parts of the transmission circuit of a link.

Fig. 2 shows the main parts of the connecting link with the adaptable repeater, in which polarized relays OVR and ZR are the local receiving and transmitting relays, respectively.

In connection with the repeater circuit a call finder OZ and the first selecting stage, group selector GK, are shown, while in the lower part of the figure the register is shown with its connections to a register finder RZ, only as far as is required for the explanation of the invention. The relays EDR1 and EDR2 discriminates the incoming and outgoing junction lines, respectively, in single current and double current lines and adapt the corresponding parts of the repeater to the kind of current used on these lines.

Operation of relays DR1 and DR2 adapts the repeater to duplex-single current traffic; such operation may be effected at will by the subscribers. The functions of the other relays will be clear from the following description.

The adaptation of the repeater, which in normal condition is switched for double current lines, to a calling single current subscriber will now be described. In normal condition of the subscriber's set in Fig. 1, a circuit is closed from —battery, over the winding of line relay LR1, the back contact of the upper change-over contact of the cut-off relay COR1, resistance R8, back contact of the upper change-over contact of relay HR, the winding of polar relay ER, the back contact of the lower change-over contact of relay COR1 to ground. In this condition, owing to the resistance R8, the current in the circuit amounts to about 5 ma., the line relay LR1 being safely kept at normal by a current of 5 ma.

Furthermore the current direction is such, that the polarized relay ER keeps its contact opened as shown, so that the printer motor M is stopped. On pressing the calling key OT resistance R8 is bridged by relay AR. The current in the subscriber's loop now increases so much, that the operation of the relays LR1 in the exchange and AR in the subscriber's set is accomplished. Relay AR bridges with its front contact the calling key OT, which then has only momentarily to be operated.

At the operation of the line relay LR1, in consequence of an incoming call, the call finders, allotted to the call are started. In Fig. 2 a free call finder OZ with a repeater is shown; the local subscriber is connected to the first contacts in the rows of contacts of the call finders. The upper front contact of line relay LR1 applies negative test voltage over a resistance R4 to the first contact of contact row *e* in all the call finders of this group.

At the receipt of a starting mark in one of the line relays, common starting relay ASR is operated in a circuit from —battery, its own winding, the lower front contact of relay LR1 to ground.

The front contact of relay ASR closes in its turn operating circuits for the starting relays SR1 of all appropriate call finders. The driving magnets of the call finders are now energized, the front contacts of relays SR1 close circuits similar to that shown in the drawing from —battery, the winding of driving magnet KM, a make contact of starting relay SR1, cut-off contacts of test relay CR and cord seizure relay KBR to ground. Call finder OZ and the other free call finders are permitted to start.

If call finder OZ of Fig. 2 is the first to reach the calling subscriber line, the test relay CR is energized in a circuit from battery, resistance R4, a make contact of relay LR1 in Fig. 1, wiper *e* of call finder OZ and the high resistance winding of relay CR to ground. At the operation of relay CR, make contact applies ground to the low resistance winding of relay CR, whereby the current increases so much, that the negative test voltage at the contacts in the *e*-rows of all call finders becomes insufficient for the operation of other test relays CR. In this manner double tests in this stage of building up the connection are prevented.

In a way analogous to the seizure of a free call finder, a number of register finders are started, one of which connects the calling subscriber to a free register. On the operation of test relay CR ground is applied to a common register starting relay RSR, which closes with its front contact circuits for the starting relays SR2 of a number of appropriate register finders. Fig. 2 shows a free register finder RZ. Relay SR2 applies ground to the driving magnet KM1 of the register finder over the right hand bank contact of relay RBR, the left hand back contact of relay RCR and its own make contact. If the register finder RZ arrives first of all at the contacts of the calling connecting link, test voltage is applied to the high resistance winding of relay RCR by means of the contact in the row *a* of the register finder. On the operation of relay RCR the register finder stops and the low resistance winding of relay RCR is connected to ground, in order to prevent double tests.

As the register test relay RCR is energized at the moment when a free register is found, operating circuits are closed for two holding relays, namely for the register holding relay RBR, which remains operated during the holding time of the register in a circuit from —battery, the winding of relay RBR and a right hand make contact of relay RCR to ground, and for the cord holding relay KBR a circuit from —battery, the winding of relay KBR, the *b*-wiper of the register finder RZ, a make contact of relay RCR and the make side of the change-over contact of relay RBR to ground. Relay KBR which has a controlling function in the connecting circuit and in the register, holds itself after the connections to the register are switched off, in a circuit over its own make contacts and the make contacts of the slow releasing guarding relays CR1 and CR2, these relays being operated in a manner, which will be described hereinafter.

The operating of the cord seizure relay KBR has some consequence, which have an extraordinary significance in the system according to the invention. First relay COR1 operates in a circuit from —battery, the winding of relay COR1, the *c*-wiper of the call finder OZ and the make side of the change-over contact of relay KBR to ground, whereby the relays LR1, CR and RCR are released. Negative test voltage is no longer applied to the contacts of the *e*-row of call finder OZ so that effective protection against double tests is provided.

Furthermore circuits for the relays, discriminating the kind of calling line, are closed in a manner now to be described. The *d* contacts in the call finder OZ, belonging to incoming single current subscriber lines, are connected to ground over an individual compensating resistance R3, shown in Fig. 1. In contro-distinction thereto, the *d*-contacts belonging to incoming double current lines, are not connected.

If the *d*-wiper encounters ground, in case a single current subscriber is calling, relay EDR1 operates in a circuit from —battery, winding of relay EDR1, the back side of its make-before-break contact, a make contact of relay KBR, call finder wiper *d* and the local compensating resistance R3 to ground. Thereafter relay EDR1 holds itself over the make side of its own make-before-break contact and a make contact of relay KBR. As the magnetisation of relay EDR1 is precluded, if the *d*-wiper of the call finder does not find a way to ground, the operated state of discriminating relay EDR1 thus forms the criterion for the connecting circuit, having been seized from the callers side by a single current line.

By the magnetisation of relay EDR1, if a single current line is connected, the windings of the local receiving relay OVR are switched in. The extremities are connected, respectively, to the line, over the *a*-wiper of a call finder OZ, and to ground over the *d*-wiper and the individual compensating resistance R3. The junction of the windings of relay OVR is connected to +pole of the battery in the register, over a make contact of relay EDR1, cut-off contacts of relays DR1, and KDR and the *g*-wiper of the register finder RZ.

In consequence of the fact, that at the operation of relay COR1, the tongue of the upper contact of this relay is moved over from −battery in the exchange to −battery in the register, and the lower tongue from ground to −telegraph battery, the current direction in the polarized relay ER is inverted, so that it closes its contact. Rectified voltage is therefore supplied to relay HR, which closes both its lower front contacts, whereby the subscriber printer motor is started, this being also the criterion for the subscriber to commence selection. From this moment the subscribers, provided with the arrangement of Fig. 1, may also adapt their apparatus for duplex-traffic.

The installation of a subscriber enabling him to work simplex or duplex, as required, comprises a relay DR3 or switch, establishing in the simplex position a circuit with the transmitting contacts E and the receiving magnet F of the teleprinter in series as termination of the one pair of wires, the other pair remaining unconnected. In the duplex position the transmitting loop with transmitting contacts E and the receiving loop with the receiving magnet F are separated, the corresponding pairs of wires respectively terminating in the local receiving relay OVR and the tongue of the local transmitting relay ZR in the exchange. The transmitting loop may contain an automatic keyer.

Fig. 1 shows an example of such a subscriber installation. If the duplex condition is wanted, relay DR3 is operated by pushing a key DT1. The subscriber set is connected in simplex line condition. When relay DR3 is in normal position, and is connected in the duplex line condition when relay DR3 is operated.

Relay DR3 closes a holding circuit for itself by its lower make contact maintaining the circuit after the release of key DT. On the operation of of the duplex relay DR3 the receiving magnet F of the teleprinter is switched in a circuit over the *b*-wiper of the call finder OZ in series with the relay DR1 in the connecting link: +telegraph battery, resistance R9, winding DR1, make contacts of the relays EDR1 and KBR, *b*-wiper of call finder OZ, upper make contact of relay DR3, receiving magnet F, make side of lower change-over contact of relay COR1, −telegraph battery. As relay DR1 operates, it closes a holding circuit for itself by means of the make side of its make-before-break contact and is inserted in series between +battery in the register and the line connected to the *b*-wiper of the call finder OZ.

Now a repeater circuit is established in which the extremities of the windings of relay OVR are connected in the same manner as disclosed for simplex-condition. However, the junction of the windings is connected to +telegraph battery over a make contact of relay DR1.

By pushing key DT2 the subscriber may again interrupt the operating circuit for relay DR3, whereby this relay and relay DR1 in the connecting line are released and the connection of the repeater toward the caller becomes again simplex.

As the calling subscriber is now connected to the register, he may transmit the series of selecting impulses by means of the dial NSI, shown in Fig. 1, to the receiving relay O in the register. After the recording of the number by the register, a line to another exchange or to another subscriber on the same exchange is obtained, dependent on the recorded number, if this line is found free. This selection, which may be done in a manner known from the usual register exchange systems, is shown in principle in Fig. 2 for the group-selector GK. From the moment when the contact *gk* is closed by the register, the starting relay SR2 is operated in a circuit over the *j*-wiper of the rigister finder. Relay SR2 closes its front contact and the driving magnet KM2 of the group-selector GK is energized. Every step, made by the group-selector GK, results in an evident manner in a de-energization of the relay UR in the register, the number of steps being controlled by the register. When group-selector GK has made a number of steps, which corresponds to the number, recorded in the register, contact *gk* is opened and relay SR2 and driving magnet KM2 release.

If the called subscriber is free, the corresponding cut-off relay COR1 will be in normal condition, and is operated in a circuit from −battery, the winding of the corresponding relay COR1, a connecting wire to the corresponding contact in the row *c* of the final selector, the *c* wipers of the group-selectors, the winding of relay KTR in the connecting link, and a make contact of relay KBR to ground. Relay KTR is thus operated after which the relays EDR2 and DR2 adapt the right hand part of the circuit to the kind of outgoing connection, in an analogous manner as already described for the relays EDR1 and DR1. If the called line is a single current line, relay EDR2 is operated, as ground is supplied to the corresponding contact in the row *d* of the final selector; owing to the operation of relay EDR2 a circuit is established for relay DR2 over the *b*-wiper of the final selector, if wanted by the called subscriber. The circuits for local transmitting relay ZR established by these switching are similar to those for local receiving relay OVR. The printer motor of the called subscriber is started by the inversion of the current direction in the subscriber loop as a result of the operation of corresponding relay COR1. The register action may then be terminated by the switching through relay KDR, to which at this moment ground is applied by an action of the register over wiper *e* of the register finder RZ. For simplex the junctions of the windings of one local receiving relay OVR and one local transmitting relay ZR are through-connected one to the tongue of the other. For duplex the tongues of these relays are connected to the receiving coils of the subscribers. From this moment the identification combination of the called subscriber may be transmitted, so that this subscriber may now transmit his name and number toward the caller as a signal, that the connection is established.

During the several actions described, circuits are established for the two supervisory relays CR1 and CR2. By the action of relay EDR1 the junction of the windings of the local receiving relay OVR is connected to +battery in the register over a make contact of relay EDR1 and a cut-off contact of relay DR1. The currents in the left and right hand windings are now such, that the tongue of relay OVR is moved over to + side of telegraph battery, if it was not already against this side. Relay CR1 is now energized in a circuit from −telegraph battery, resistance R1, a make contact of relay KBR, CR1 winding, spacing side of the local receiving relay OVR tongue to +telegraph battery. Relay CR2 operates likewise in a circuit from −telegraph battery, make contact of relay KBR, CR2 windings, cut-off contact of relay KDR, $g$-wiper of register finder RZ to +battery in the register.

The function of the relays CR1 and CR2 is to establish a holding circuit for the cord seizure relay KBR, which circuit may be interrupted by these relays when desired by the subscribers. Relay CR1 supervises the connection toward the calling subscriber, relay CR2 supervises the connection toward the called subscriber. The caller, as well as the called subscriber, are able to interrupt the connection by pushing the release key ST of Fig. 1 for some moments, e. g. 200 milliseconds. This key interrupts, when pushed down by the calling subscriber, the loop terminated by the local receiving relay OVR, and when pushed down by the called subscriber, the loop terminated by the local transmitting relay ZR. As a consequence the tongues *ovr* or *zr*, respectively, of the relays OVR or ZR, move over to −battery for a time which is long enough to release the slowly actuated relay CR1 or CR2. The breaking of the holding circuit of relay KBR restores the link to free condition. Relays CR1 and CR2 must be slow releasing relays, since they are not to release, when during the spacing elements of the repeated telegraph signals the tongues of the relays OVR and ZR are brought against −battery.

If the connection is not yet fully completed, the caller may stop the building up of the connection by pushing the release key ST, causing relay CR1 to be released, whereas the register may release the connection by demagnetizing relay CR2, if the called subscriber is found busy. The word "busy" may be transmitted to the caller by the register, before the release occurs. From the foregoing description of that adaptation of the repeater to a single current line and the building up of the connection between subscribers, it will be clear that the repeater is in normal position suitable for the interconnection of double current lines, as relays EDR1, EDR2, DR1 and DR2 are in non-operated position.

As described hereinbefore the contacts in the $d$-row of the call finders OZ are not connected to ground for double current-lines. Thus after the operation of the cord seizure relay KBR no ground is applied to the relay EDR1, this relay remaining now operated. As the operating circuit for relay DR1 contains a make contact of relay EDR1, relay DR1 does not operate either. The windings of the local receiving relay OVR are switched in series between the tongue of the trunk receiving relay ITL.OVR and ground, over a cut-off contact of relay EDR1. The junction of the windings remains unconnected, owing to an open make contact of relay EDR1. The trunk transmitting relay ITL.$Zr$ is over the $b$-wiper and cut-off contacts of relays EDR1 and DR1, connected to the tongue of relay ZR, when relay KDR is energized by the register. The called side of the repeater may be adapted to the kind of the called line in a way similar to that described for a single current line, or to that described now for a double current line.

Furthermore, a free register may be seized in the same manner as by a local subscriber by a district subscriber or by another exchange, the junction lines of which to the exchange are double current lines. In normal condition the armature of the trunk receiving relay ITL.OVR is against −pole of battery. At an incoming subscriber's call, which is characterized in the emission of +voltage on the trunk line by the subscriber, the tongue is moved toward +pole of battery, and line relay DR2 is energized in a circuit from +telegraph battery, over the tongue of relay ITL.OVR, the back contact of the upper change-over contact of relay COR2, and the windings of relay LR2 to −battery. The consecutive switchings, resulting in the seizure of a free connecting link and a free register, follow in the same manner as described for a single current subscriber.

As soon as the relay KBR operates, ground is applied to the left hand winding of relay OVR, and the tongue of this relay moves over to the +side of telegraph battery, as marking current is sent by the calling subscriber. Thus the operating circuits for slow releasing supervising relays CR1 and CR2 are established.

It is observed, that subscribers connected to the exchange over double current lines have also possibility to work duplex with the arrangement of the invention. These subscribers are connected over a local single current line to a repeater, inverting the single current signals to double current signals over the interlocal double current line to the exchange. The trunk junction lines are suitable for duplex-traffic. The adaptation of the subscriber set to the four wire traffic, which has only consequences on the single current part of this connection to the exchange, has no influence on the condition of the trunk junction line and the repeater in the connecting link of the automatic exchange.

While I have illustrated and described what I regard to be the preferred embodiment of my invention, nevertheless it will be understood that such is merely exemplary and that numerous modifications and rearrangements may be made therein without departing from the essence of the invention, I claim:

1. Telegraph system comprising in combination, an exchange; a plurality of subscribers; single current lines and double current lines for connecting each of said subscribers to said exchange; means operated by said subscribers, respectively, for changing said single current lines from two-wire (simplex) lines to four-wire (duplex) lines and vice versa; a repeater circuit in said exchange; and means in said repeater circuit for discriminating between simplex and duplex among said single current lines.

2. Telegraph system comprising in combination, an exchange; a plurality of subscribers; single current lines and double current lines for connecting each of said subscribers to said exchange; means operated by said subscribers, respectively, for changing said single current lines from two-wire (simplex) lines to four-wire (duplex) lines and vice versa; a repeater circuit in said exchange; a relay in said repeater circuit for discriminating between single and double current lines among said lines; and a relay in said repeater circuit for discriminating between simplex and duplex among said single current lines.

3. Telegraph system comprising in combination, an exchange; a plurality of subscribers; single current lines and double current lines for connecting each of said subscribers to said exchange, said exchange including apparatus individual to one of said subscribers and serving to terminate said subscribers' line; neutral relays forming part of and constituting said apparatus;

means operated by said subscribers, respectively, for changing said single current lines from two-wire (simplex) lines to four-wire (duplex) lines and vice versa; a repeater circuit in said exchange; and means in said repeater circuit; for discriminating between simplex and duplex among said single current lines.

4. Telegraph system comprising in combination, an exchange; a plurality of subscribers; single current lines and double current lines for connecting each of said subscribers to said exchange, said exchange including apparatus individual to one of said subscribers and serving to terminate said subscribers' line; neutral relays forming part of and constituting said apparatus; means operated by said subscribers, respectively, for changing said single current lines from two-wire (simplex) lines to four-wire (duplex) lines and vice versa; a repeater in said exchange; a combination of relays in said repeater circuit for discriminating between single and double current lines among said lines; and a combination of relays in said repeater circuit for discriminating between simplex and duplex lines among said single current lines.

5. Telegraph system comprising in combination, an exchange; a plurality of subscribers; single current lines and double current lines for connecting each of said subscribers to said exchange, said exchange including apparatus individual to one of said subscribers and serving to terminate said subscribers' line; neutral relays forming part of and constituting said apparatus; means including switches and relays operated by said subscribers, respectively, for changing said single current lines from two-wire (simplex) lines to four-wire (duplex) lines and vice versa; a repeater in said exchange; and a relay in said repeater circuit for discriminating between single and double current lines among said lines.

6. Telegraph system comprising in combination, an exchange; a plurality of subscribers; single current lines and double current lines for connecting each of said subscribers to said exchange, said exchange including apparatus individual to one of said subscribers and serving to terminate said subscribers' line; neutral relays forming part of and constituting said apparatus; means including switches and relays operated by said subscribers, respectively, for changing said single current lines from two-wire (simplex) lines to four-wire (duplex) lines and vice versa; a repeater in said exchange; a relay in said repeater circuit for discriminating between single and double current lines among said lines; and a relay in said repeater circuit for discriminating between simplex and duplex lines among said single current lines.

7. Telegraph system comprising in combination, an exchange; a plurality of subscribers; single current lines and double current lines for connecting each of said subscribers to said exchange, said exchange including apparatus individual to one of said subscribers and serving to terminate said subscribers' line; neutral relays forming part of and constituting said apparatus; means including switches and relays operated by said subscribers, respectively, for changing said single current lines from two-wire (simplex) lines to four-wire (duplex) lines and vice versa; a repeater in said exchange; a combination of relays in said repeater circuit for discriminating between single and double current lines among said lines; and a combination of relays in said repeater circuit for discriminating between simplex and duplex lines among said single current lines.

8. Telegraph system comprising in combination, an exchange; a plurality of subscribers; single current lines and double current lines for connecting each of said subscribers to said exchange; resistances associated, respectively, with said single current lines and limiting the current thereof to a constant output; means operated by said subscribers, respectively, for changing said single current lines from two-wire (simplex) lines to four-wire (duplex) lines and vice versa; a repeater circuit in said exchange; a relay in said repeater circuit for discriminating between single and double current lines among said lines; and a relay in said repeater circuit for discriminating between simplex and duplex among said single current lines.

9. Telegraph system comprising in combination, an exchange; a plurality of subscribers; single current lines and double current lines for connecting each of said subscribers to said exchange, said exchange including apparatus individual to to one of said subscribers and serving to terminate said subscribers line; resistances associated, respectively, with said single current lines and limiting the current thereof to a constant output; neutral relays forming part of and constituting said apparatus; means operated by said subscribers, respectively, for changing said single current lines from two-wire (simplex) lines to four-wire (duplex) lines and vice versa; a repeater in said exchange; a combination of relays in said repeater circuit for discriminating between single and double current lines among said lines; and a combination of relays in said repeater circuit for discriminating between simplex and duplex lines among said single current lines.

10. Telegraph system, comprising in combination, an exchange; a plurality of subscribers; single current lines and double current lines for connecting each of said subscribers to said exchange, said exchange including apparatus individual to one of said subscribers and serving to terminate said subscribers line; resistances associated, respectively, with said single current lines and limiting the current thereof to a constant output; neutral relays forming part of and constituting said apparatus; means including switches and relays operated by said subscribers, respectively, for changing said single current lines from two-wire (simplex) lines to four-wire (duplex) lines and vice versa; a repeater in said exchange; a relay in said repeater circuit for discriminating between single and double current lines among said lines; and a relay in said repeater circuit for discriminating between simplex and duplex lines among said single current lines.

ROELOF M. M. OBERMAN.

REFERENCES CITED

The following references are of record in the file of this patent:

UNITED STATES PATENTS

| Number | Name | Date |
|---|---|---|
| 1,800,019 | Hewett | Apr. 7, 1931 |
| 2,114,324 | Weld | Apr. 19, 1938 |
| 2,176,963 | Hallden | Oct. 24, 1939 |
| 2,199,284 | Duerr | Apr. 30, 1940 |
| 2,228,890 | Singer | Jan. 14, 1941 |

FOREIGN PATENTS

| Number | Country | Date |
|---|---|---|
| 531,902 | Great Britain | Jan. 14, 1941 |